(12) United States Patent
Derridinger, Jr.

(10) Patent No.: US 7,301,127 B1
(45) Date of Patent: Nov. 27, 2007

(54) COOKING DEVICE

(76) Inventor: Richard K. Derridinger, Jr., 6010 Bonacker Dr., Tampa, FL (US) 33610

( * ) Notice: Subject to any disclaimer, the term of this patent is extended or adjusted under 35 U.S.C. 154(b) by 338 days.

(21) Appl. No.: 11/032,645

(22) Filed: Jan. 11, 2005

(51) Int. Cl.
*A47J 37/04* (2006.01)
*A47J 37/07* (2006.01)

(52) U.S. Cl. .................. 219/386; 219/392; 219/411; 219/414; 99/446

(58) Field of Classification Search .............. None
See application file for complete search history.

(56) References Cited

U.S. PATENT DOCUMENTS

| | | | |
|---|---|---|---|
| 1,690,570 A * | 11/1928 | Dalbey, Sr. ............... 99/425 |
| 2,744,994 A * | 5/1956 | Bruckner et al. ........... 219/405 |
| 3,789,748 A * | 2/1974 | Rappoport et al. ......... 99/446 |
| 4,034,663 A | 7/1977 | Jenn et al. |
| 4,321,857 A * | 3/1982 | Best ........................ 99/446 |
| 5,176,067 A | 1/1993 | Higgins |
| 5,536,518 A * | 7/1996 | Rummel ................... 99/446 |
| 5,582,094 A | 12/1996 | Peterson |
| 6,104,004 A | 8/2000 | Ragland |
| 6,114,666 A * | 9/2000 | Best ........................ 219/411 |
| 6,881,055 B2 * | 4/2005 | Bird ........................ 126/19 M |

* cited by examiner

*Primary Examiner*—Joseph Pelham
(74) *Attorney, Agent, or Firm*—Richard K. Derridinger, Jr.

(57) ABSTRACT

The cooking device of the present invention operates in the 100 to 250 volt AC range acting as either, a grill, a smoker, an oven or a rotisserie. The cooking device is compact, being portable or fixed so as to allow the user to maximize limited space such as on a balcony or patio. A digital microprocessor-based temperature controller with LED readout is used for the set temperature and the process temperature. The shell is made of stainless steel which retains maximum heat and has a removable grease tray. The device is approximately 23" wide by 14" high by 21" deep and has stainless steel round rods for the cooking grates and warming rack.

10 Claims, 11 Drawing Sheets

COOKING DEVICE

BACKGROUND OF THE INVENTION (1) Field of the Invention

The present invention generally relates to cooking devices and, more particularly pertains to an electric cooking device.

(2) Description of the Prior Art

The present invention is an improvement over U.S. Pat. No. 6,104,004 an electric barbecue grill with a 2400 Watt electric heating source so as to provide cooking temperatures of at least 500 degrees F. U.S. Pat. No. 5,582,094 an barbecue grill including an insulated top, a drain and an electric heat source. U.S. Pat. No. 5,176,067 is an indoor grill having a base, a reflector, a heating element and a food support grill. U.S. Pat. No. 4,034,663 is a ventilated portable electric grill for use on a kitchen countertop area or the like.

SUMMARY OF THE INVENTION

In view of the forgoing disadvantages inherent in the known cooking device now present in the prior art, the present invention provides an electric cooking device. As such, the general purpose of the present invention, which will be described subsequently in greater detail, is to provide a new and improved cooking device and method of use which has all the advantages of the prior art and none of the disadvantages.

To attain this, the present invention provides the improvement of an electric cooking device using a digital microprocessor-based temperature controller with LED readout for both the temperature setting and the process temperature which combined with a set temperature alarm and process timer to take the guess work out of many food preparation processes. With the LED (light emitting diode) readout the operator can monitor both the desired temperature setting and the process temperature easily which is often is in low outdoor light level conditions. The control panel is tilted at the operator for easy data entry and process monitoring.

The hood hinges, located at the top, allow for minimal heat loss when opening and closing the hood in combination with double walled construction of both the hood and the hood walls. The self sealing action of the hood sides further reduces heat loss when the hood is in the closed position. The grease tray pan is hidden from view and slides out completely out of the cooking device, for easy cleaning. The present invention design is an outdoor cooking device that will operate in the 100 to 250 volt AC range and act as a grill, smoker, oven, and or rotisserie or any combination thereof. The apparatus is compact, portable or fixed, so as to allow the user to maximize limited space such as on a balcony or patio where space is a concern and where the use of open flame type cooking appliances such as propane and charcoal grills are prohibited. One object of the present invention is to construct the cooker as a metal enclosure that will be both aesthetically pleasing, retain maximum heat, and have a removable slide out grease tray as an intricate part of the heating element housing which is hidden from plain view and to optimize the use of a digital microprocessor-based temperature controller. The present cooking device has a two tier design. The upper section is the device cooking area while the lower section houses the functional elements and the grease tray.

The preferred device dimensions are 24" wide by 14" high by 21" deep. The cooking device may also range in various widths, heights and widths. The preferred material for use in the construction of the present invention is 18 gauge type 304 stainless steel for the appliance chassis, stainless steel round rod for the cooking grate and the warming rack while stainless steel is also used for the handle, hinges and the fasteners; but not limited too.

Power is supplied, to the cooking device, by the use of an electrical cord set. The cooking device is wired with an in-line slow blow fuse and is connected to an illuminated on/off splash proof switch which will switch the power to a digital microprocessor based temperature controller with an L.E.D. readout. The operating temperatures shall be monitored by a thermocouple which is mounted inside the cooking device. The operating temperatures shall be monitored by a thermocouple mounted inside the cooking device enclosure. The temperature shall then maintain the set temperature by electromagnetically opening and closing a set of electrical contacts within a relay leading to the heating element. The hood elements are a double walled construction in both the hood and the hood sides with an insulating air space between the outer and inner wall.

The preferred list and amount of parts for the present cooking device comprise, in combination: (the list of parts are numbered the same as the drawing part numbers)

(2) One cooking device lid.
(4) One lid handle.
(5) Two lid handle screws.
(6) Two lid hinges.
(8) One cooking device hood.
(10) Two device hood sides.
(11) One grill device base.
(12) Two base sides.
(13) One base back.
(14) Four legs.
(18) One base front.
(25) A plurality of grease tray vent holes.
(30) One grease drip tray.
(32) One grease tray pan.
(33) Tray lip.
(34) Two drip tray handles.
(35) One vent bracket.
(38) One on/off switch.
(40) One warming rack.
(41) Two warming rack bracket.
(42) One interior light.
(44) One light housing.
(45) Two cooking grates.
(52) One electric power cord.
(53) One heating elements.
(54) One grill hood back.
(55) Two heating element bracket.
(57) One thermocouple bracket.
(58) One electric power cord grip.
(60) One LED readout.
(61) One timer function button.
(62) One set timer and temperature value down button.
(63) One set timer and temperature value up button.
(64) One start & stop timer function button.
(65) One heating element on indictor light.
(66) One alarm light.
(67) One timer light.
(68) One set temperature light.
(70) One device base bottom.
(74) One device base access cover.
(76) A plurality of base access cover screws.
(100) The general control panel area.

The present cooking device has a preferred method of operation comprising, in combination:

(1) Plug the cooking device into the desired electrical source.

(2) Turn cooking device on at on/off switch.

(3) Using the appropriate up or down arrows depress the arrow until desired cooking temperature is displayed on the L.E.D. readout.

(4) Allow the cooking device to preheat until desired cooking temperature is displayed on the L.E.D. readout.

(5) Set the optional timer by depressing the (F) button until it is displayed on the L.E.D. readout then enter the desired time value in minutes by depressing the up or down arrow until desired value is displayed, depress (F) button again to enter time value.

(6) Place the food on cooking grates, close hood.

(7) Start timer by depressing clock symbol button until the timer indicator light begins to flash.

(8) After the set time value has been reached, the alarm will sound. Depress the time symbol button to deactivate alarm.

(9) Remove the cooked food and turn cooking device off at the on/off switch.

There has thus been outlined, rather broadly, the electric cooking device of the invention in order that the detailed description thereof that follows may be better understood, and in order that the present contribution to the art may be better appreciated. There are, of course, additional features of the present invention that will be described hereinafter and which will form the subject matter of the claims appended hereto.

In this respect, before explaining at least one embodiment of the present invention in detail, it is to be understood that the present invention is not limited in its application to the details of construction and the arrangement of the components set forth in the following description or illustrated in the drawings. The invention is capable of other embodiments and of being practiced and carried out in various ways, also, it is to be fully understood that the phraseology and terminology employed herein are for the purpose of description and therefore should not be regarded as limited.

As such, those skilled in the art will appreciate that the conception, upon which this disclosure is based, may readily be utilized as a basis for the designing of other structures, methods and systems for carrying out the several purpose of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the present application. The abstract is neither intended to define the invention of the application, which is measured by the claims, nor is it intended to be limited as to the scope of the present invention in any way.

It is therefore an object of the present invention to provide a new and improved electric cooking device which has the advantage of the prior art devises and none of the disadvantages.

It is another object of the present invention to provide a new and improved electric cooking device which may be easily and efficiently manufactured and marketed.

It is a further object of the present invention to provide a new and improved electric cooking device which is of a durable and reliable construction.

An even further object of the present invention is to provide a new and improved electric cooking device which is susceptible of a low cost of manufacture with regard to both materials and labor, and which accordingly is then susceptible of low prices of sale to the consuming public, thereby making such an electric cooking device economically available to the buying public.

Still yet another object of the present invention is to provide a new and improved electric cooking device which provides in the apparatuses and methods of the prior art some of the advantages thereof, while simultaneously overcoming some of the disadvantages normally associated therewith.

Still another object of the present invention is to provide a new and improved electric cooking device operable from a novice's level.

Yet another object of the present invention is to provide a new and improved system electric cooking device.

These together with other objects of the present invention, along with the various features of novelty which characterize the present invention, are pointed out with a particularity in the claims annexed to and forming a part of this disclosure. For a better understanding of the present invention, its operating and installation advantages and the specific objects attained by its uses, reference should be had to the accompanying drawings and descriptive matter in which there are illustrated preferred embodiments of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
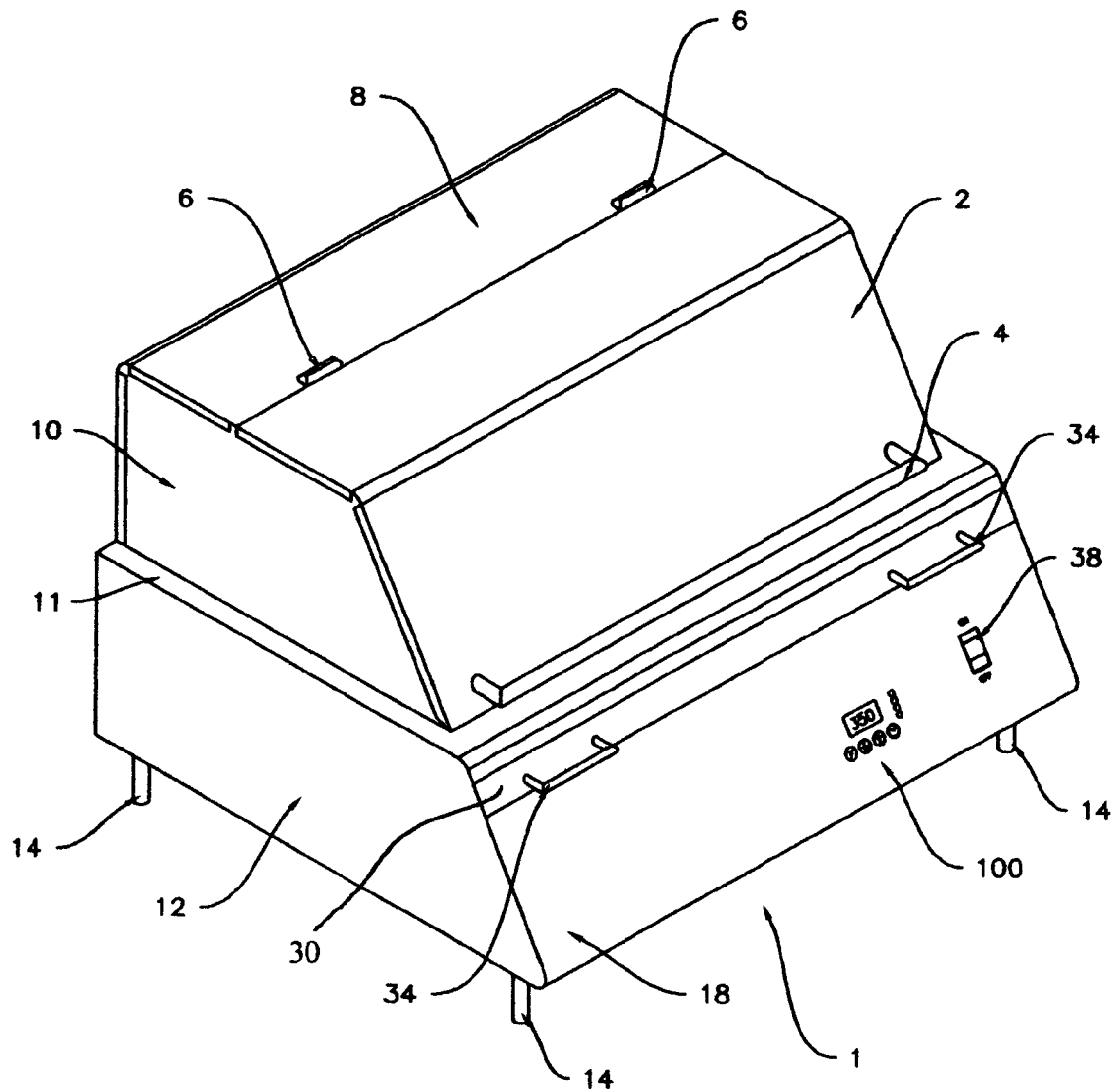
FIG. 1 is a perspective view of the electric device with the lid closed.
Figure 11:
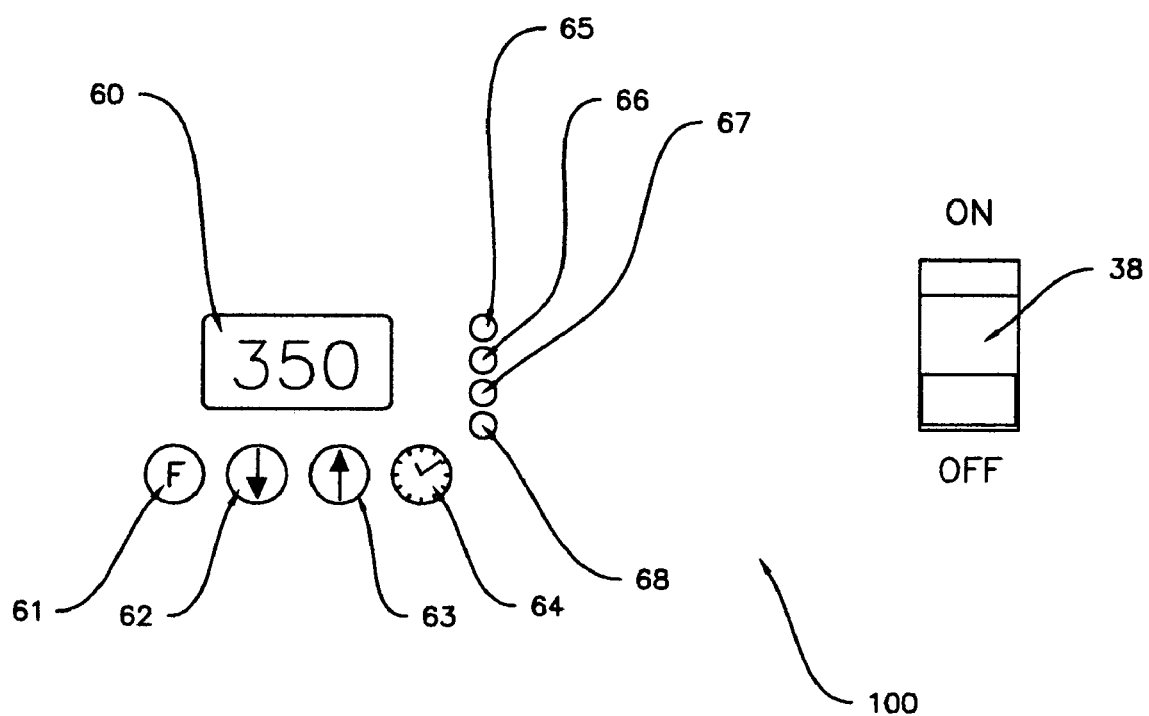
FIG. 11 is a blown up view showing the control panel features.

In the present invention FIG. 1 shows a perspective view of the cooking device 1 with device lid 2, lid handle 4, lid hinges 6, device hood 8, device hood side 10, device base 11, device base side 12, legs 14, device base front 18, grease drip tray 30 with grease tray handles 34 and overall control panel features 100 located of the device base front 18 of cooking device 1 with on/off switch 38. FIG. 11 will show a blown up detailed view of the general control panel area 100.

Figure 2:
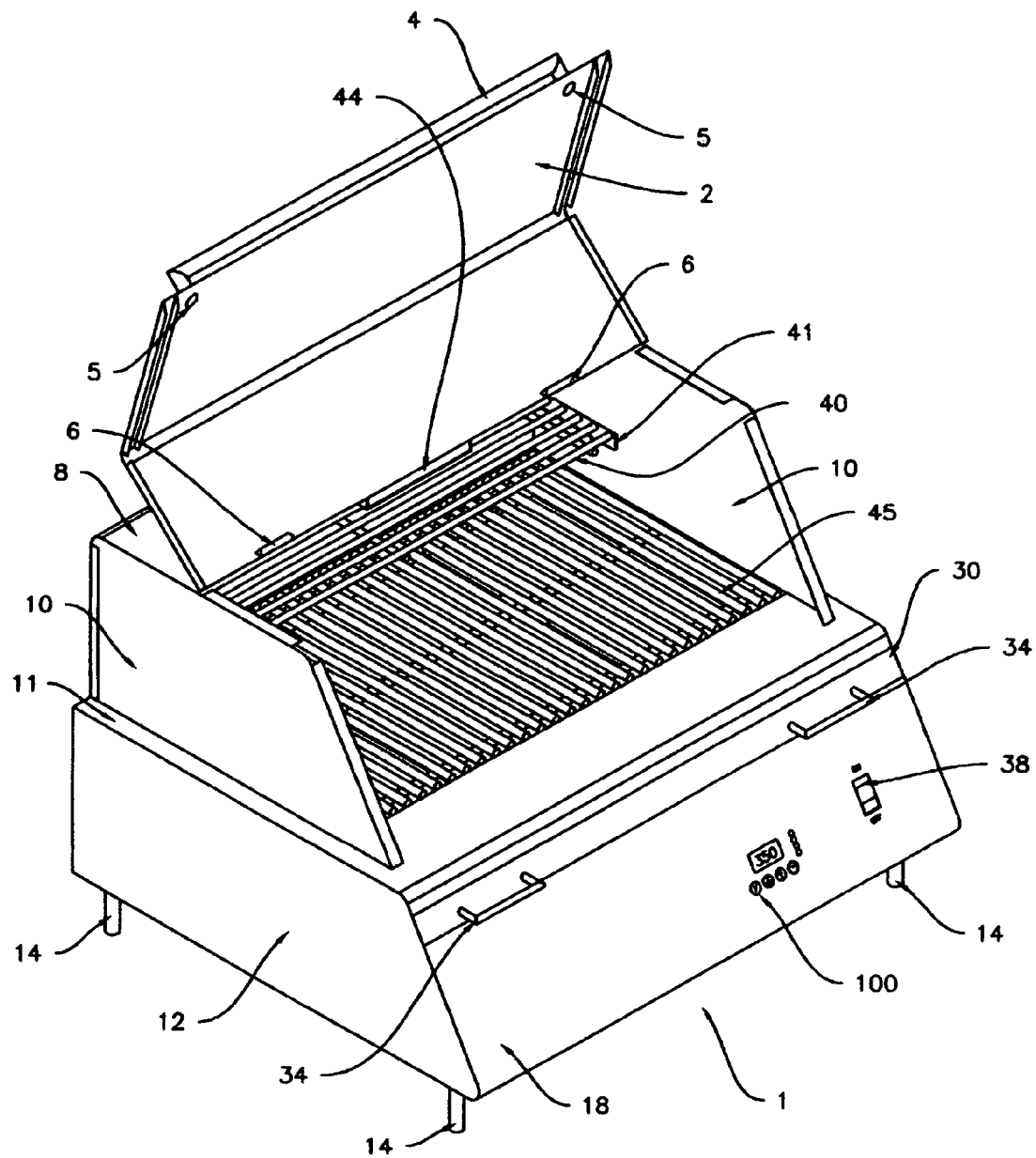
FIG. 2 is a perspective view of the electric cooking device with the lid in the open position showing both cooking grates.

In FIG. 2 the perspective view of cooking device 1 is shown supported by legs 14, device base 11, with device base side 12, devise base front 18 and grease tray 30 with grease tray handles 34 and on/off switch 38. The upper hood section shows device hood 8 with hood sides 10, cooking grates 45, warming rack 40 with warming grate bracket 41, cooking device lid 2 has device lid handle 4 attached to lid 2 by screws 5 and hinges 6 while interior light housing 44 is also shown. FIG. 11 will show a blown up detailed view of the general control panel area 100.

Figure 3:
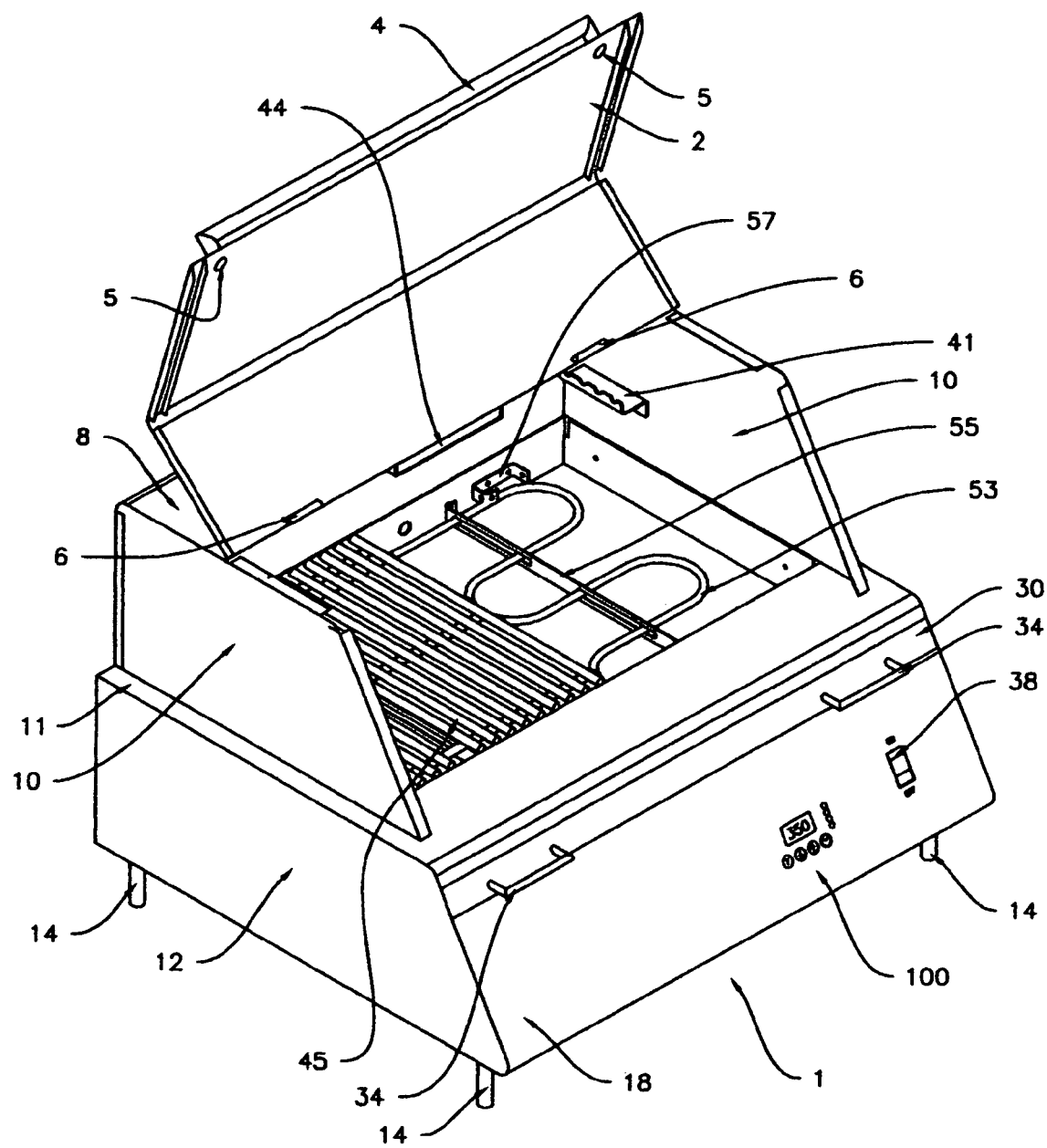
FIG. 3 is a perspective view of the electric cooking device with the lid open showing the cooking grate removed.

FIG. 3 shows the perspective view of cooking device 1 with lid 2, attached lid handle 4 by screws 5. Hinges 6 attach device lid 2 to device hood 8 with hood sides 10. Device base 11 has side 12 with base front 18 has legs 14 which support cooking device 1. Device 1 has grease tray 30 with handles 34, on/off switch 38 with general control panel area 100. Within the interior of device 1 is shown light housing 44, warming rack bracket 41, cooking grate 45, heating element 53, heating element bracket 55 and thermocouple bracket 57.

Figure 4:
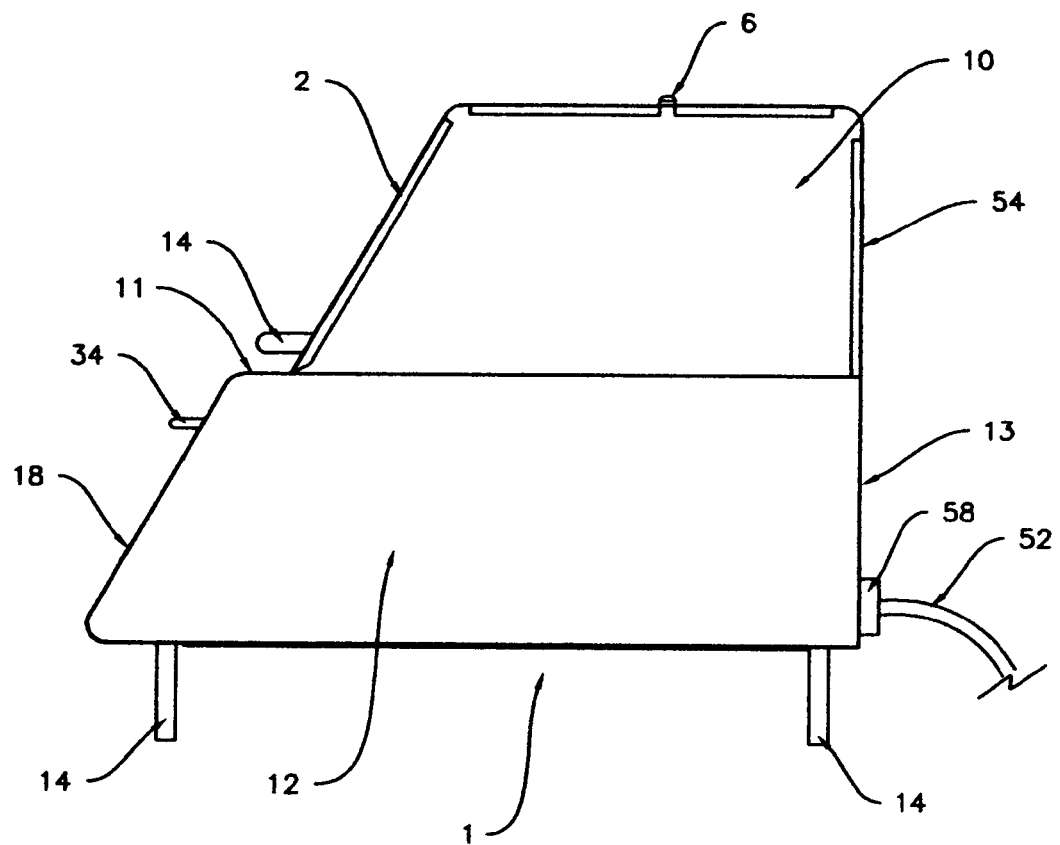
FIG. 4 is a flat side view of the cooking device.

FIG. 4 is a flat side view of cooking device 1, device base 11, device base face 18, device base back 13, device base side 12 with legs 14, device hood side 10, lid 2, lid handle 4 with lid hinge 6, hood back 54, grease tray handle 34, electric cord 52 secured to grill 1 by electric cord grip 58.

Figure 5:
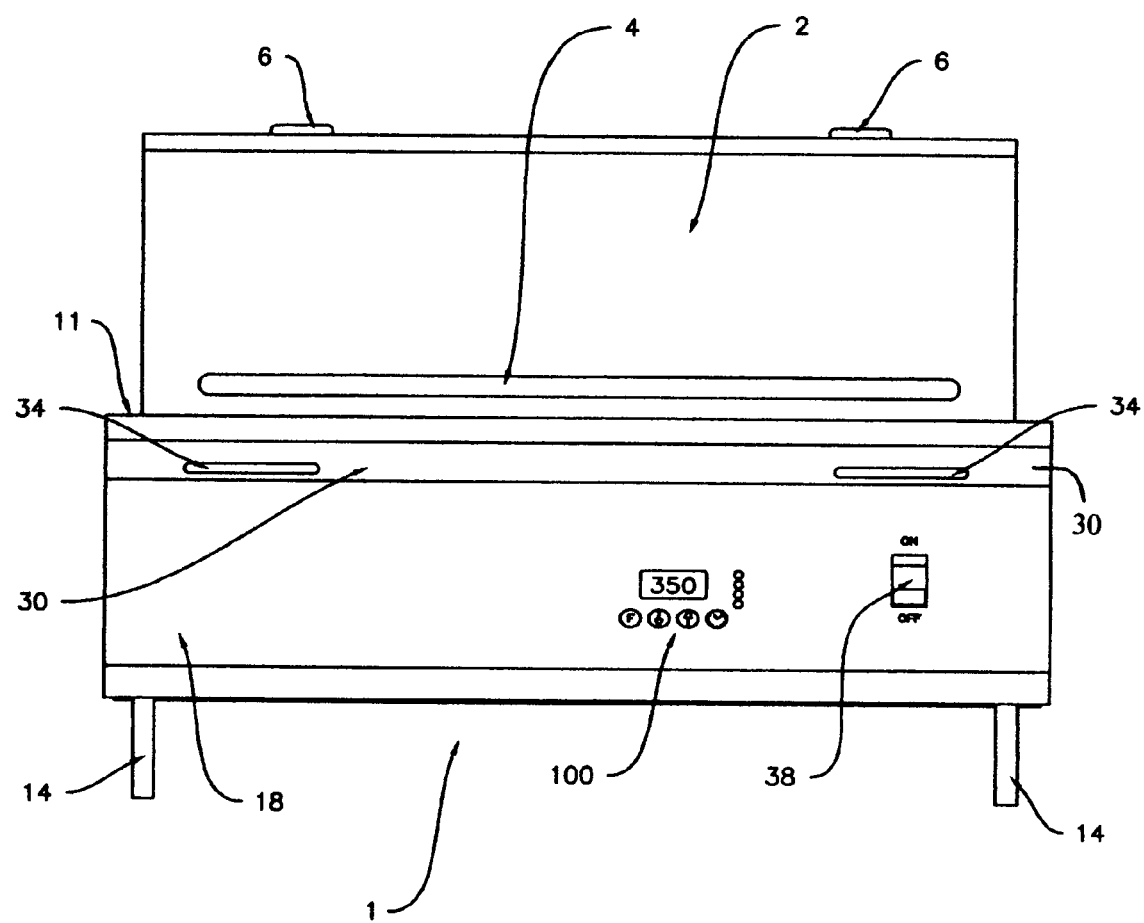
FIG. 5 is a flat front view of the cooking device.

FIG. 5 is a flat front view of cooking device 1, device base 11 with base face 18, legs 14 and grease tray 30 with grease tray handles 31 while device lid 2 has handle 4 with lid hinges 6. Base face 18 is also shown with on/off switch 38 with general control panel area 100.

Figure 6:
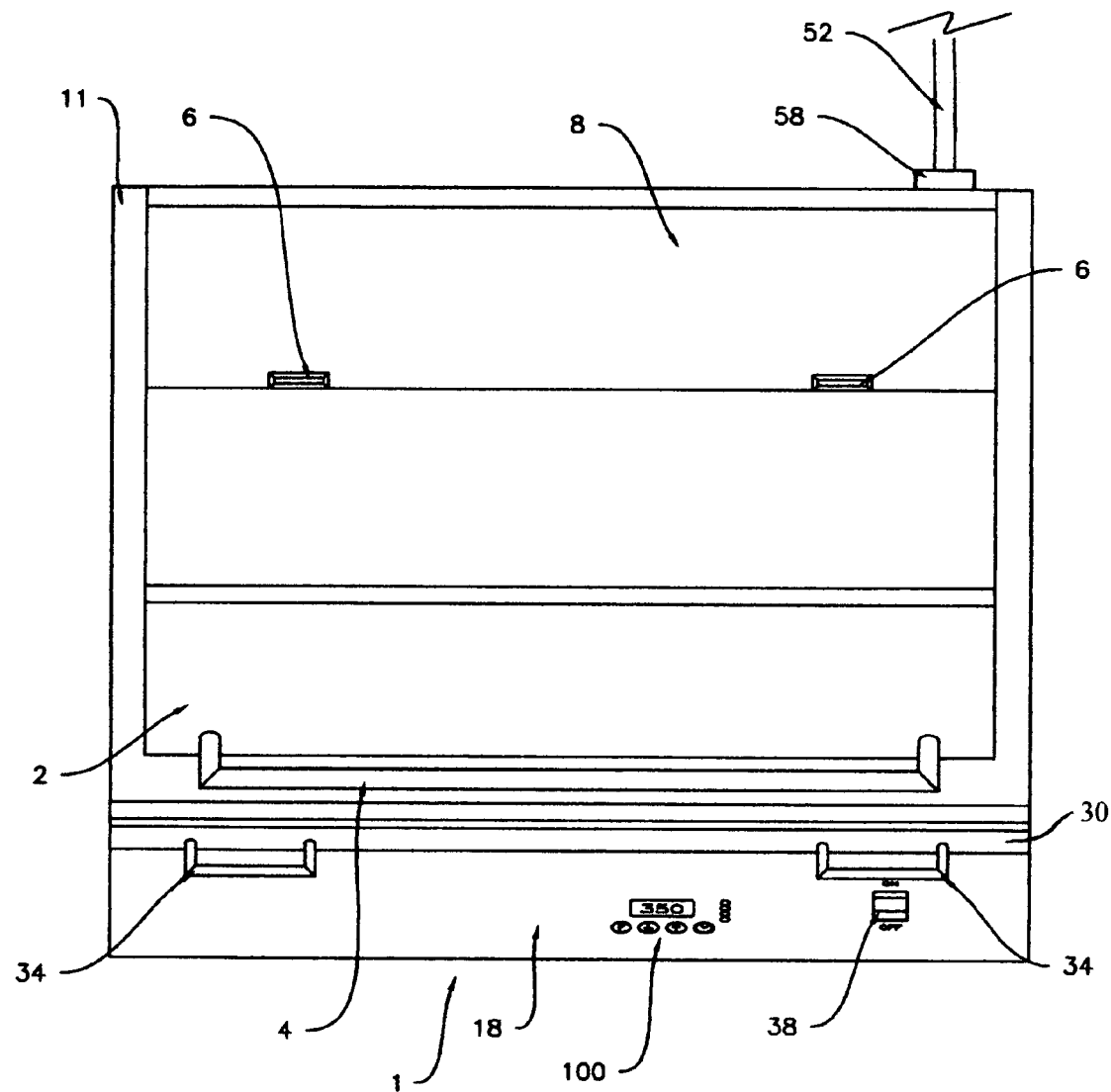
FIG. 6 is a flat top view of the cooking device.

FIG. 6 is a flat top view showing cooking device 1 with device lid 2, lid handle 4, device hood 8, hinges 6 and electric cord 57 with electric cord grip 58 while lid 2 has lid handle 4. Device base 11 has device face 18 with on/off switch 38 and grease tray handles 34 and electric cord 52 with cord grip 58.

Figure 7:
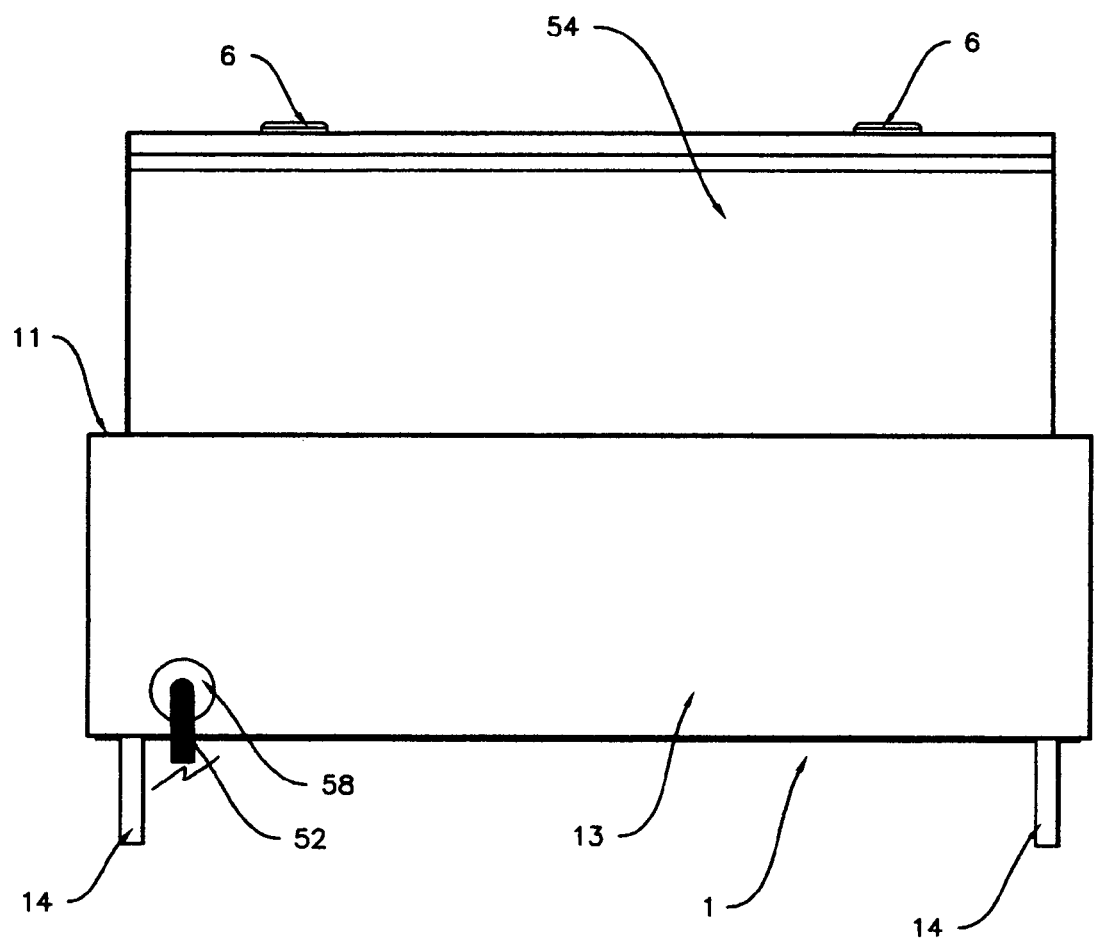
FIG. 7 is a flat back view of the cooking device.

FIG. 7 is a flat back view of cooking device 1 showing the device hood back 54 with legs 14, device base 11, device base back 13, hinges 6 and electric cord 52 with cord grip 58.

Figure 8:
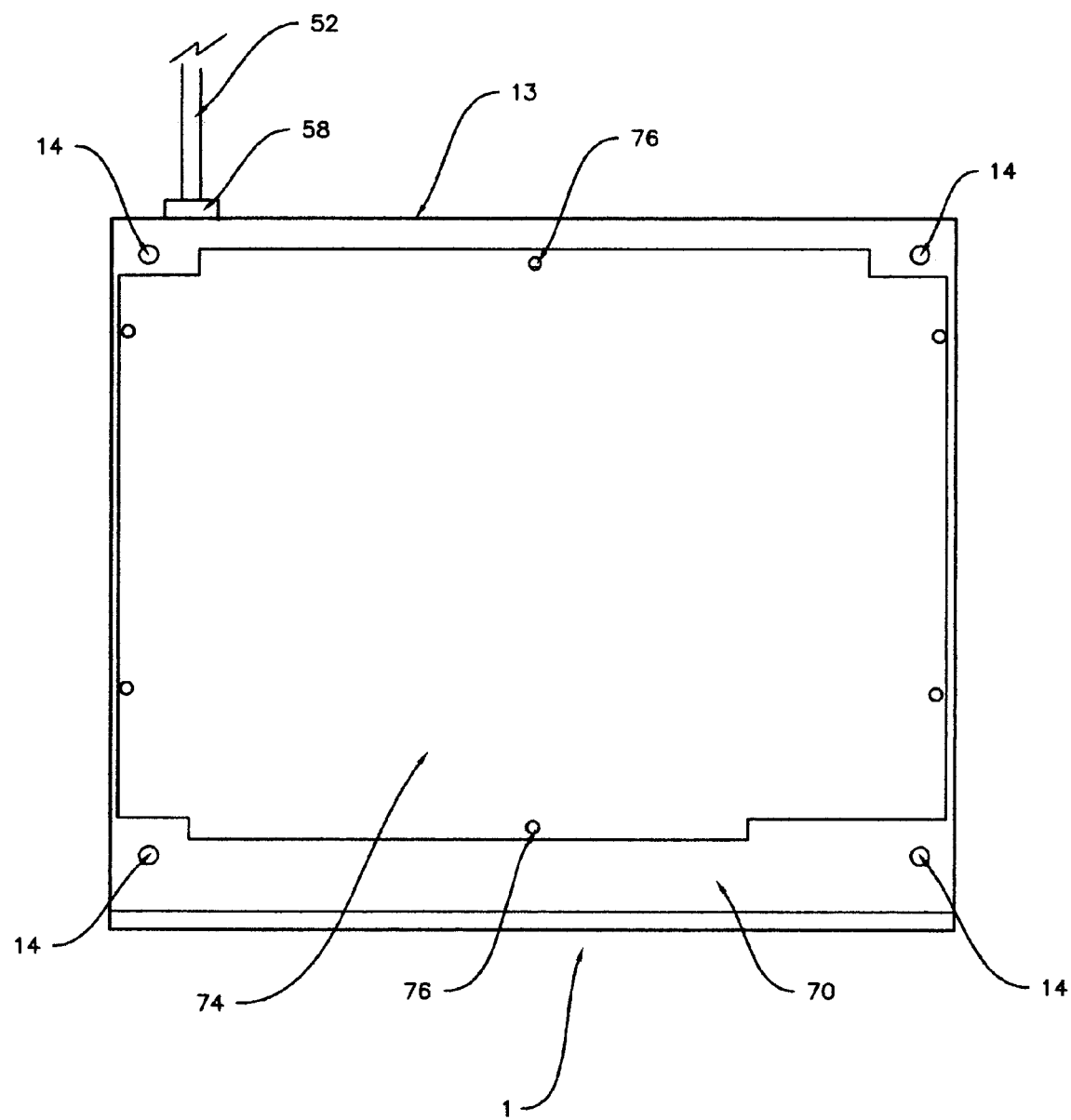
FIG. 8 is a flat bottom view of the cooking device.

FIG. 8 is a flat bottom view of cooking device 1 showing cooking device base bottom 70, removable access cover 74 and screws 76 which secures access cover 74 to device base bottom 70 while legs 14 are shown located in each corner of device bottom 70. Attached to the base back 13 of cooking device 1 is electric cord 52 with cord grip 58.

Figure 9:
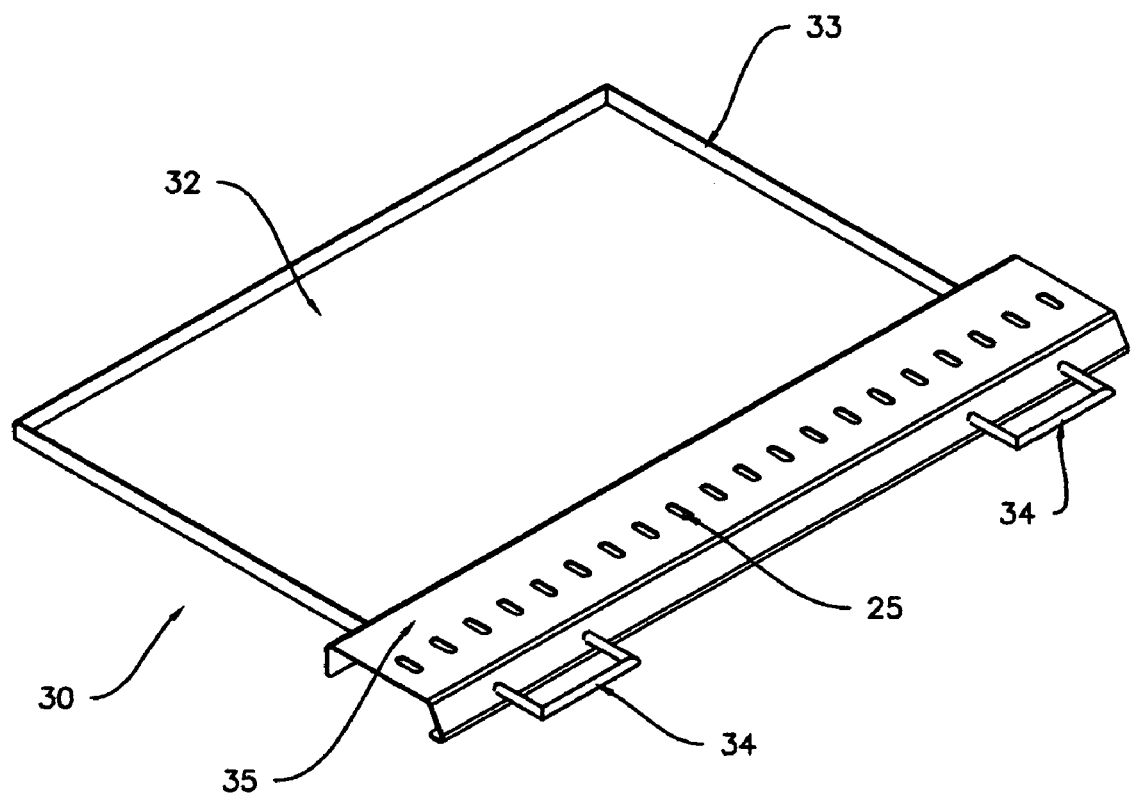
FIG. 9 is a perspective view showing the grease drip tray.

FIG. 9 is a perspective view of the grease drip tray 30, tray bed 32, tray lip 33, tray vent bracket 35, vent holes 25 and grease tray handles 34.

Figure 10:
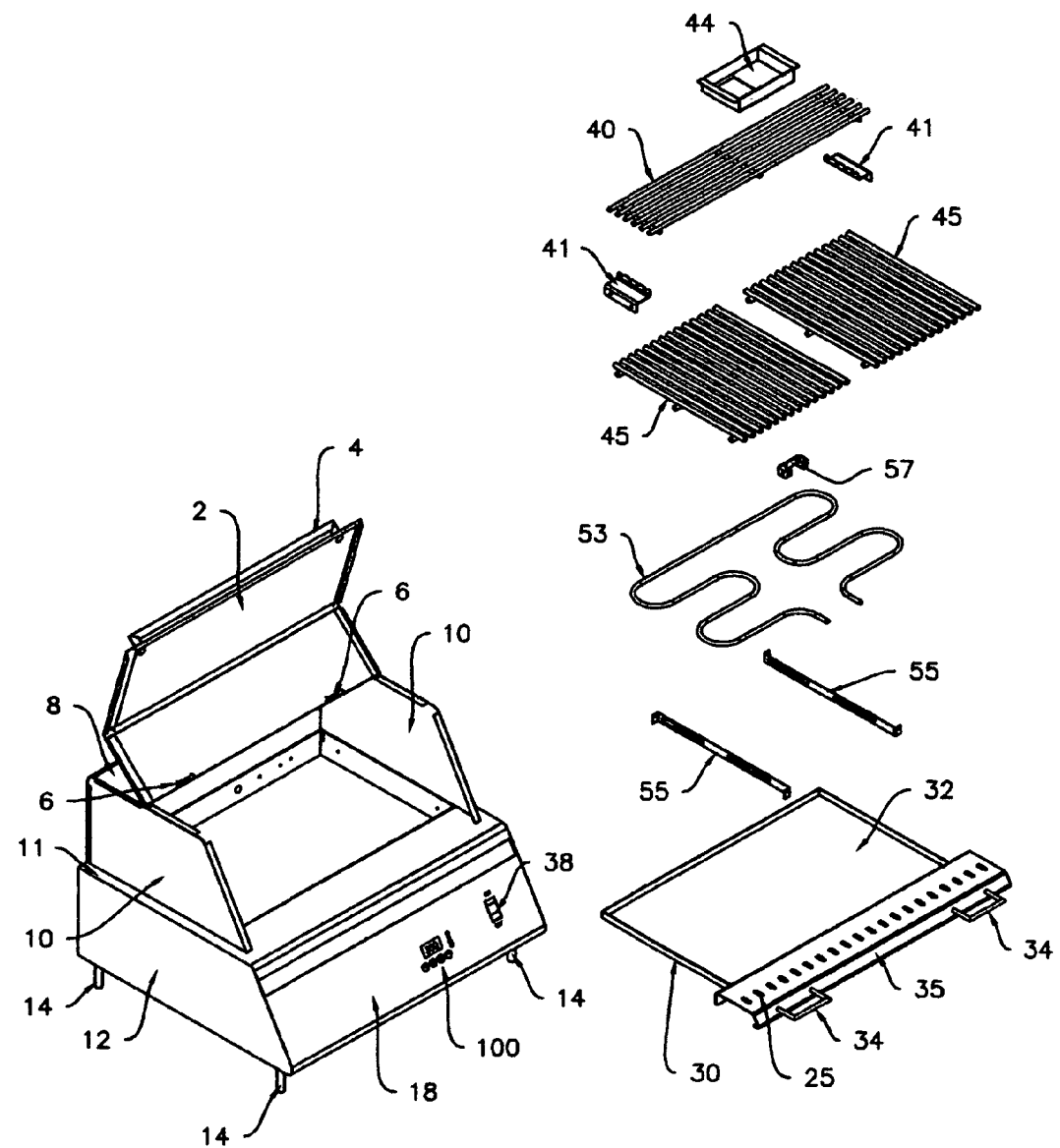
FIG. 10 is a break away view of the component parts of the cooking grate.

FIG. 10 is a break away view if the component parts for the present cooking device showing the shell of the cooking device with lid 2, cooking device hood 8, device base 11, device hood sides 10, base side 12, legs 14, general control panel area 100 and on/off switch 38.

Grease tray 30 is shown with drip tray bed 32; tray vent bracket 35 with vent holes 25 and tray handles 34. Also shown are: heating element 53, two grate brackets 55, two cooking grates 45 and two warming rack brackets 41 for warming rack 40, thermocouple bracket 57 and light housing 44.

FIG. 11 is the blown up detailed view of the general control panel area 100 showing LED readout 60, timer function button 61, set timer down button 62, timer up button 63, start and stop timer button 64 along with on/off switch 38 with heat indicator on light 65, alarm light 66, timer light 67 and setting point light 68.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will be readily occur to those skilled in the art, it is not desired to limit the invention to the exact construction and operation shown and described, and accordingly, all suitable modifications and equivalents may be resorted to, falling within the scope of the invention.

What is claimed is:

1. A cooking device comprising;

A base having front, side, back faces, and an opening of the top, and a grate mounted at the top opening, An electric heating element mounted in the base beneath the grate, a substantially flat grease tray slidably mounted below the heating element in the base and removable through the front of the base by handles accessible at the front face of the base;

a digital microprocessor-based temperature controller mounted below the grease tray and inside the base, a control panel with temperature display means on the front face and below the grease tray handles, the display indicating both the operating and set point temperatures;

a hood attached to the top surface of the base and surrounding the sides and back of the top opening, the hood having substantially flat, vertical sides and back, a substantially horizontal, rectangular top portion with opposing side, front, and back edges, the opposing side edges joined to the top edges of the hood sides, the back edge joined to the top edge of the hood back, and the front edge joined by a horizontal hinge to a fitted lid which closes against both a top portion of both hood sides and the front of both hood sides to completely seal the cooking space, the substantially planar surfaces of the lid being perpendicular to the substantially planar surface of the hood sides.

2. The cooking device as recited in claim 1, further comprising double walled construction of the hood.

3. The cooking device as recited in claim 1, further comprising thermocouple-based temperature control.

4. The cooking device as recited in claim 1, further comprising timer light.

5. The cooking device as recited in claim 1, further comprising an LED display.

6. The cooking device as recited in claim 1, further comprising a light to illuminate the cooking space.

7. The cooking device as recited in claim 1, further comprising a slanted front face of the base, make the control panel easily accessible to the user.

8. The cooking device as recited in claim 1, further comprising means to use the cooking device as a grill, smoker, oven, or rotisserie, or any combination thereof.

9. The cooking device as recited in claim 1, further comprising means to protect the electronics from moisture so that it can be used outdoors.

10. The cooking device as recited in claim 1, further comprising a warming grill mounted above the rear of the grate.

* * * * *